United States Patent
King

(10) Patent No.: US 10,506,903 B2
(45) Date of Patent: Dec. 17, 2019

(54) SYSTEM AND METHOD FOR VACUUM-POWERED DEBRIS SEPARATION

(71) Applicant: Skitter & Squirt Adventures, LLC, Missoula, MT (US)

(72) Inventor: Jack M. King, Phoenix, AZ (US)

(*) Notice: Subject to any disclaimer, the term of this patent is extended or adjusted under 35 U.S.C. 154(b) by 132 days.

(21) Appl. No.: 15/705,129

(22) Filed: Sep. 14, 2017

(65) Prior Publication Data
US 2019/0075985 A1  Mar. 14, 2019

(51) Int. Cl.
| | |
|---|---|
| *B01D 46/00* | (2006.01) |
| *A47L 9/02* | (2006.01) |
| *A47L 9/32* | (2006.01) |
| *A47L 9/10* | (2006.01) |
| *B01D 45/04* | (2006.01) |
| *B01D 45/08* | (2006.01) |
| *A47L 5/28* | (2006.01) |
| *A47L 5/30* | (2006.01) |

(52) U.S. Cl.
CPC .............. *A47L 9/02* (2013.01); *A47L 9/10* (2013.01); *A47L 9/32* (2013.01); *B01D 45/04* (2013.01); *B01D 45/08* (2013.01); *A47L 5/28* (2013.01); *A47L 5/30* (2013.01)

(58) Field of Classification Search
CPC ...... A47L 9/02; A47L 9/10; A47L 9/32; A47L 5/28; A47L 5/30; A47L 5/32; A47L 9/00; A47L 9/009; B01D 45/04; B01D 45/08
See application file for complete search history.

(56) References Cited

U.S. PATENT DOCUMENTS

| | | | | |
|---|---|---|---|---|
| 1,783,276 A | * | 12/1930 | Bliss | E06B 7/10 181/292 |
| 1,857,348 A | * | 5/1932 | Bokenkroger | B01D 46/00 55/446 |
| 2,064,903 A | * | 12/1936 | Ghignatti | A47L 9/02 15/227 |
| 2,634,820 A | * | 4/1953 | Andersen | B01D 46/00 55/313 |
| 2,912,918 A | * | 11/1959 | Mead | B08B 15/026 451/88 |
| 3,693,457 A | * | 9/1972 | Pilat | G01N 15/0255 55/325 |
| 3,744,222 A | * | 7/1973 | Delao | B01D 45/08 428/186 |
| 3,834,135 A | * | 9/1974 | Jordan | B01D 45/08 126/299 D |

(Continued)

FOREIGN PATENT DOCUMENTS

JP 56021621 A * 2/1981

*Primary Examiner* — Dung H Bui
(74) *Attorney, Agent, or Firm* — Lisa Foundation Patent Law Clinic at Arizona State University

(57) ABSTRACT

Methods and apparatus for debris separation generally comprise a vacuum hose attachment comprising a collar and an attachment body. The attachment body further comprises an external face, external face openings, nubs, valley, an internal baffle, and internal baffle openings. In some embodiments, the external face openings are arranged in a lattice pattern and separated by nubs in a first direction and valleys in a second direction. In some embodiments, the attachment body may further comprise handgrips. The present invention also includes a method for separating debris via a vacuum hose attachment.

14 Claims, 17 Drawing Sheets

(56) References Cited

U.S. PATENT DOCUMENTS

| | | | | |
|---|---|---|---|---|
| 4,019,987 | A * | 4/1977 | Krasnow | B01D 29/07 210/232 |
| 4,180,461 | A | 12/1979 | Langvik | |
| 4,443,233 | A * | 4/1984 | Moran | B01D 45/08 55/315 |
| 4,627,406 | A * | 12/1986 | Namiki | F01M 13/04 123/572 |
| 4,764,186 | A * | 8/1988 | Langer | G01N 1/2202 55/443 |
| 4,799,944 | A * | 1/1989 | Dixon | B01D 45/08 55/446 |
| 4,830,644 | A * | 5/1989 | Gutermuth | B01D 45/06 24/545 |
| 5,041,146 | A * | 8/1991 | Simmerlein-Erlbacher | B01D 45/10 55/444 |
| 5,142,732 | A | 9/1992 | Davis | |
| 5,342,422 | A * | 8/1994 | Wimbock | B01D 45/08 55/444 |
| 5,500,271 | A * | 3/1996 | Pasch | B01D 39/12 428/135 |
| 5,785,851 | A * | 7/1998 | Morris | B01D 29/031 210/489 |
| 6,071,419 | A * | 6/2000 | Beier | B01D 29/012 210/767 |
| 6,656,244 | B1 * | 12/2003 | Galassi | B01D 45/06 55/444 |
| 7,041,159 | B2 * | 5/2006 | Entezarian | B01D 50/002 55/320 |
| 7,232,477 | B2 * | 6/2007 | Rodgers | B01D 45/12 55/318 |
| 8,234,750 | B2 | 8/2012 | Hawkins | |
| D685,898 | S * | 7/2013 | Platt | D23/365 |
| 8,562,708 | B2 * | 10/2013 | Platt | B01D 46/10 55/497 |
| 8,597,393 | B2 * | 12/2013 | Morita | B01D 46/523 55/521 |
| 8,657,912 | B2 * | 2/2014 | Park | B01D 45/16 55/437 |
| 2002/0083692 | A1 * | 7/2002 | Richerson | B01D 45/08 55/521 |
| 2002/0189213 | A1 * | 12/2002 | Neuschwander | B01D 45/08 55/385.3 |
| 2005/0252181 | A1 * | 11/2005 | Ranalli | B01D 45/04 55/446 |
| 2006/0000196 | A1 * | 1/2006 | Beier | B01D 39/1615 55/497 |
| 2006/0096259 | A1 * | 5/2006 | Meerpohl | B01D 29/01 55/482 |
| 2007/0163216 | A1 * | 7/2007 | Smasal | B01D 45/08 55/446 |
| 2009/0019822 | A1 * | 1/2009 | Feisthammel | B01D 45/08 55/385.4 |
| 2012/0084986 | A1 | 4/2012 | Klawitter | |
| 2014/0272211 | A1 * | 9/2014 | Nguyen | H01J 37/32495 428/34.1 |
| 2015/0040767 | A1 * | 2/2015 | Sugio | B01D 45/08 96/417 |
| 2015/0362196 | A1 * | 12/2015 | Chen | F24C 15/2035 55/437 |
| 2016/0032798 | A1 * | 2/2016 | Herman | B01D 45/08 95/268 |
| 2016/0107106 | A1 * | 4/2016 | Brown | B01D 45/04 210/496 |
| 2016/0175749 | A1 * | 6/2016 | Suda | B01D 45/04 95/269 |
| 2016/0346720 | A1 * | 12/2016 | Modena | B01D 45/08 |

* cited by examiner

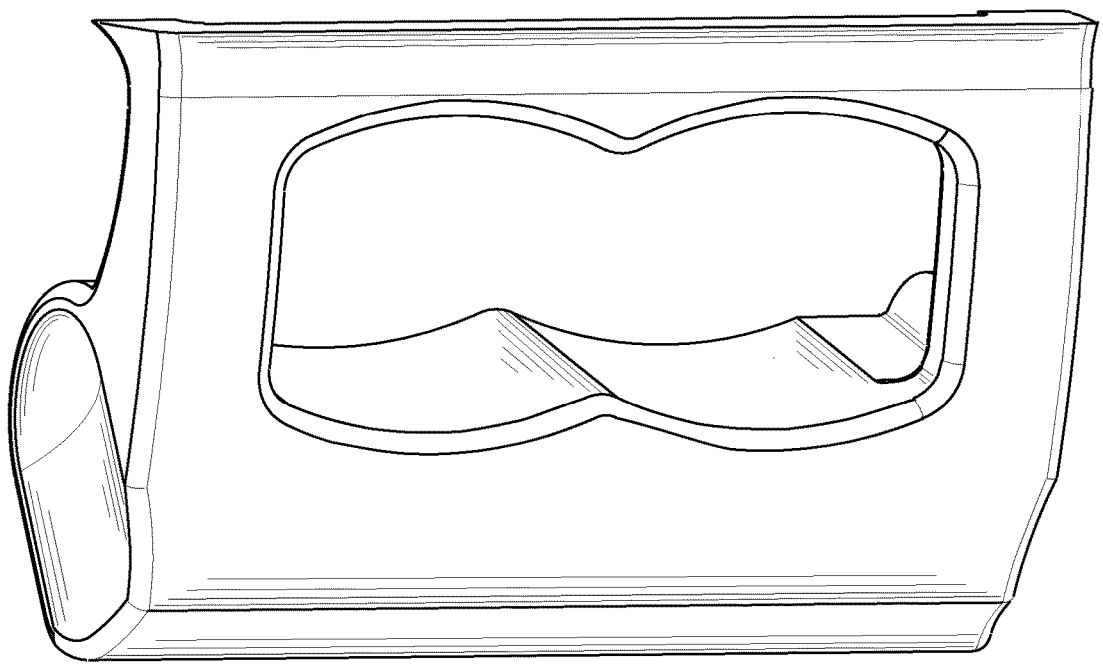
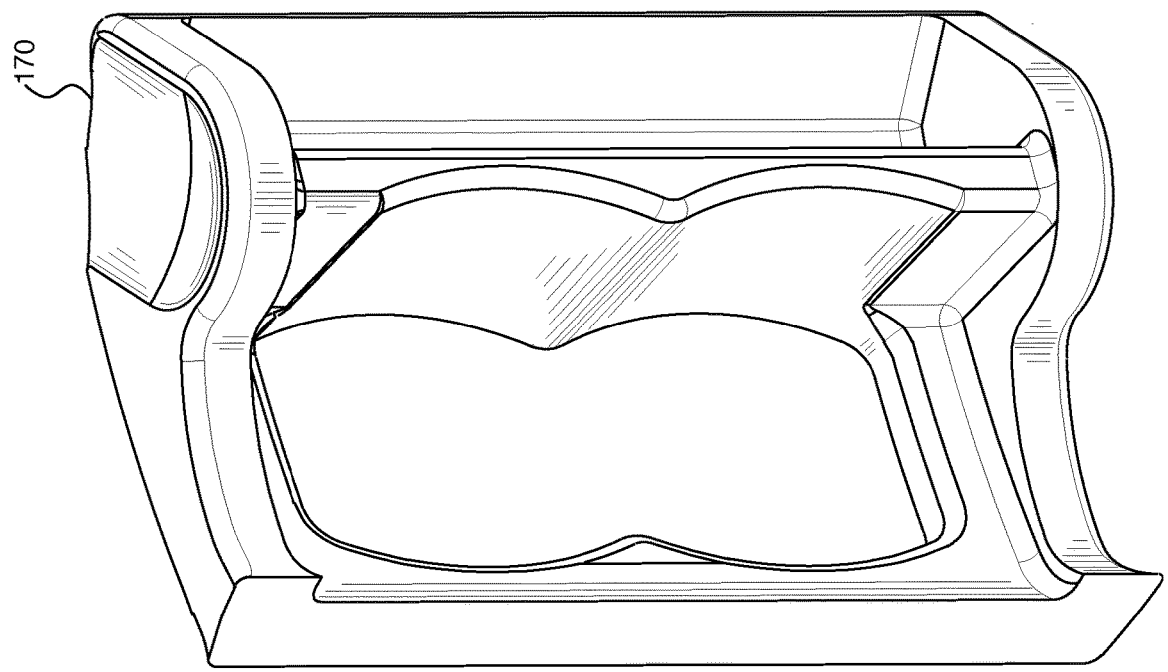
FIG. 14

SYSTEM AND METHOD FOR VACUUM-POWERED DEBRIS SEPARATION

BACKGROUND OF INVENTION

1. Field of the Invention

Embodiments described herein relate generally to vacuums and vacuum hose attachments. More specifically, embodiments of the subject matter described herein relate to a system and method for vacuum-powered debris separation.

2. Description of Related Art

The efficacy of a vacuum is determined by its suction power. Large debris can greatly reduce the suction power of the vacuum and prove to be a major problem for vacuum hoses and in turn, the vacuum itself. A typical industrial-sized vacuum hose used in industries such as tile removal is often several inches wide and several feet long and permits any debris smaller that the diameter of the hose to enter the system. When debris similar in size to the vacuum hose enters the system, the debris will often get stuck in the vacuum hose and clog the vacuum. As the vacuum is hose is several feet long, it is often difficult and time-consuming to reach the debris costing precious time and money on a job site. Additionally, long sharp debris, such as long splinters, may cause damage to the vacuum and reduce the lifespan of the device. To combat these issues, the operator of the vacuum will often try to manually prevent offending debris from entering the system. However, the process is imperfect and large debris will sometimes still clog the vacuum.

So as to reduce the complexity and length of the Detailed Specification, and to fully establish the state of the art in certain areas of technology, Applicant herein expressly incorporates by reference all of the following materials identified in each numbered paragraph below.

U.S. Pat. No. 5,142,732 discloses an industrial vacuum attachment that separates bulky material from finer debris. This device attaches onto the back of a truck and contains baffles and filters and classifies debris by size.

U.S. Pat. No. 4,180,461 discloses a vacuum separator with a pair of offset filter disks in series. The offset filter disks separate solid materials from a slurry.

U.S. Pat. No. 8,234,750 discloses a vacuum cleaner with a dirt separator. The dirt separator is a separate chamber on the vacuum and separation is accomplished with a vortex.

U.S. Patent Publication 2012/0084986 discloses a power tool/vacuum hose attachment. By combining a cutting device and a vacuum hose, the user minimizes the dust created in its use.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant will amend the specification to expressly recite the essential material that is incorporated by reference as allowed by the applicable rules.

SUMMARY OF THE INVENTION

In various representative aspects, the present invention may comprise a vacuum hose attachment comprising a collar and an attachment body. The attachment body may further comprise an external face on the exterior of the attachment body, an internal baffle within the attachment body between the external face and the collar and handgrips. The external face may further comprise external face openings separated by nubs and valleys that are substantially adjacent to the external face openings. The internal baffle may further comprise internal baffle openings that are non-coaxial with the axes perpendicular to the external face passing through the external face openings.

In one exemplary embodiment, the external face openings may be arranged in a lattice pattern.

In another exemplary embodiment, the nubs on the external face may be a square pyramid shape extending away from the external face. In another exemplary embodiment, the nubs on the external face may be a hemisphere extending away from the external face.

In another exemplary embodiment, the nub may be twice the length of the external face opening.

In another exemplary embodiment, the combined area of the external face openings may be equivalent to the cross-sectional area of the vacuum hose.

In another exemplary embodiment, the external face openings may be frustoconically shaped.

In another exemplary embodiment, the valleys may be the same width as each opening and the same length of as each nub.

In another exemplary embodiment, the collar may be configured to be housed inside the vacuum hose.

In another exemplary embodiment, the vacuum hose attachment may comprise a handgrip on the collar.

In another exemplary embodiment, the vacuum hose attachment may be comprised of nylon.

Implementations of a method of separating debris may comprise of allowing airflow across an external face such that debris is prevented from suctioning onto the face of the device, allowing debris smaller than the external face opening to pass through the device, and allowing debris that passes through the external face opening to pass through the internal baffle opening.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of post-AIA 35 U.S.C.

§ 112(f). Thus, the use of the words "function," "means" or "step" in the Detailed Description or Description of the Drawings or claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of post-AIA 35 U.S.C. § 112(f). Moreover, even if the provisions of post-AIA 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 14 depicts alternative views of an implementation of a handgrip.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
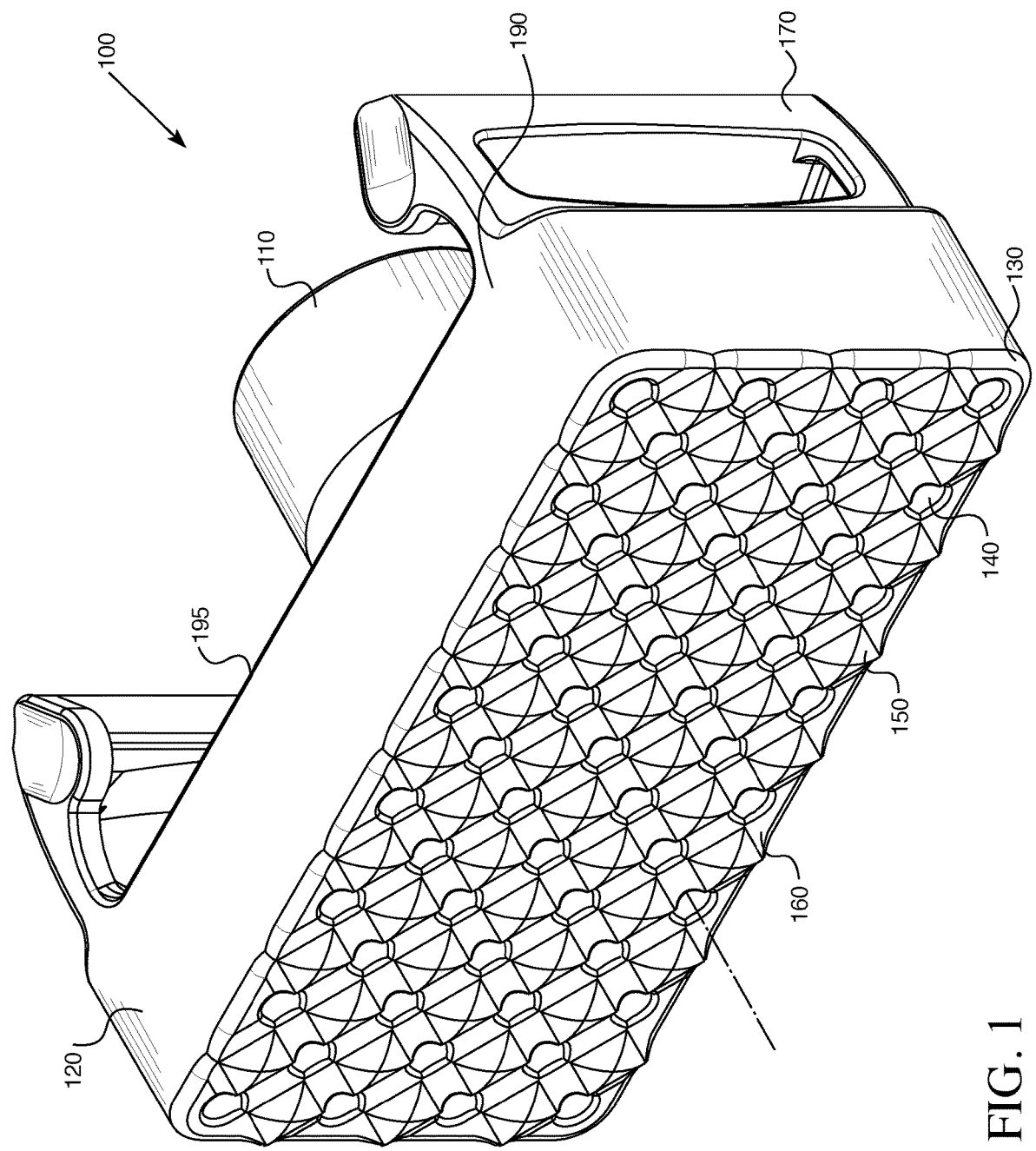
FIG. 1 depicts an isometric view of an implementation of an exterior of a vacuum hose attachment.
Figure 2:
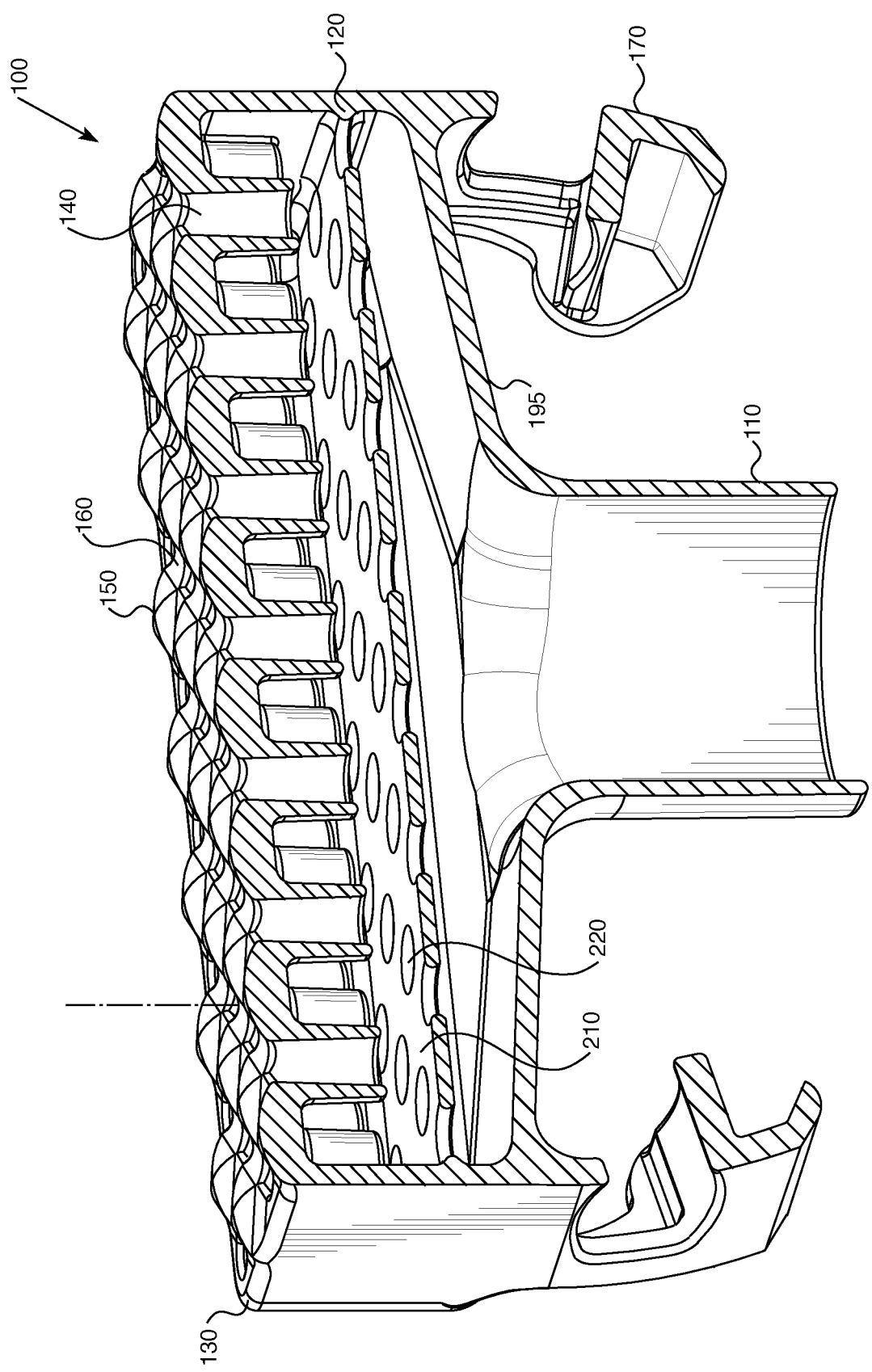
FIG. 2 depicts a cutaway view of an implementation of a vacuum hose attachment.

FIGS. 1-2 illustrate an exemplary embodiment of a vacuum hose attachment 100. In a non-limiting exemplary embodiment, a vacuum hose attachment 100 comprises a collar 110 and an attachment body 120 wherein the collar 110 is coupled to attachment body 120. The collar 110 may couple to a vacuum hose and may be detachable from the attachment body 120. The attachment body 120 may comprise an external face 130, an internal baffle 210, sidewalls 190, collar face 195, and handgrips 170. In a non-limiting exemplary embodiment, the attachment body 120 may comprise external face 130, 4 sidewalls 190, and collar face 195 and may substantially take the shape of a hollow rectangular prism. The shape of attachment body 120 may be any system for providing structure to the vacuum hose attachment 100, such as a trapezoidal prism or a cylindrical shape. The attachment body 120 may also have handgrips 170 coupled to attachment body 120. Handgrips 170 may comprise one or more handholds for the user to stabilize vacuum hose attachment 100. In a non-limiting exemplary embodiment, 2 handgrips 170 may be coupled to collar face 195. Handgrips 170 may be coupled to any sidewall 190 or collar face 195. Collar face 195 may be tapered such that debris that passes through vacuum attachment 100 is funneled towards collar 100.

Additionally, external face 130 may comprise external face openings 140, nubs 150, and valleys 160. External face openings 140 may be any shape such as a round or square opening and may be any size smaller than debris that may clog a vacuum hose. In a non-limiting exemplary embodiment, external face openings 140 may be round with a diameter of approximately ⅜". Nubs 150 may surround external face openings 140 in a first direction. Nubs 150 may comprise raised portions of external face 130 configured to prevent debris from suctioning onto external face 130. Nubs may take the shape of a small spike protruding from external face 130, a square pyramid, or a hemisphere. In a non-limiting exemplary embodiment, nubs 150 may take the shape of a square pyramid extending away from external face 130 with a width approximately twice the diameter of external face openings 140. Valleys 160 may be arranged such that debris is further prevented from suctioning onto external face 130. Valleys 160 may be disposed within the spaces between external face openings 140 and nubs 150. In a non-limiting exemplary embodiment, valleys 160 may be approximately the same width as external face openings 140 and approximately the same length as nubs 150. External face openings 140, nubs 150, and valleys 160 may be arranged such that the external face openings form a lattice pattern surrounded by nubs in a first direction and valleys in a second direction.

As illustrated in FIG. 2, internal baffle 210 may further comprise internal baffle openings 220. Internal baffle 210 may be disposed within attachment body 120 and may be configured to prevent long, sharp debris from passing through vacuum attachment 100. In a non-limiting exemplary embodiment, internal baffle 210 may comprise a flat surface comprising a plurality of internal baffle openings 220. Internal baffle openings 220 may be any shape such as a round or square opening and may be any size smaller than debris that may clog a vacuum hose. Internal baffle openings 220 may have a diameter larger than external face openings 140 such that debris that passes through external face openings 140 may pass through internal baffle openings 220. In a non-limiting exemplary embodiment, internal baffle openings 220 may be round openings with a diameter slightly larger than external face openings 140. Axes perpendicular to external face 130 pass through external face openings 140. Internal baffle openings 220 are non-coaxial with the axes passing through external face openings 140 such that long, sharp debris may be prevented from passing through vacuum attachment 100. Internal baffle openings 220 may also be arranged in a lattice pattern.

Figure 3:
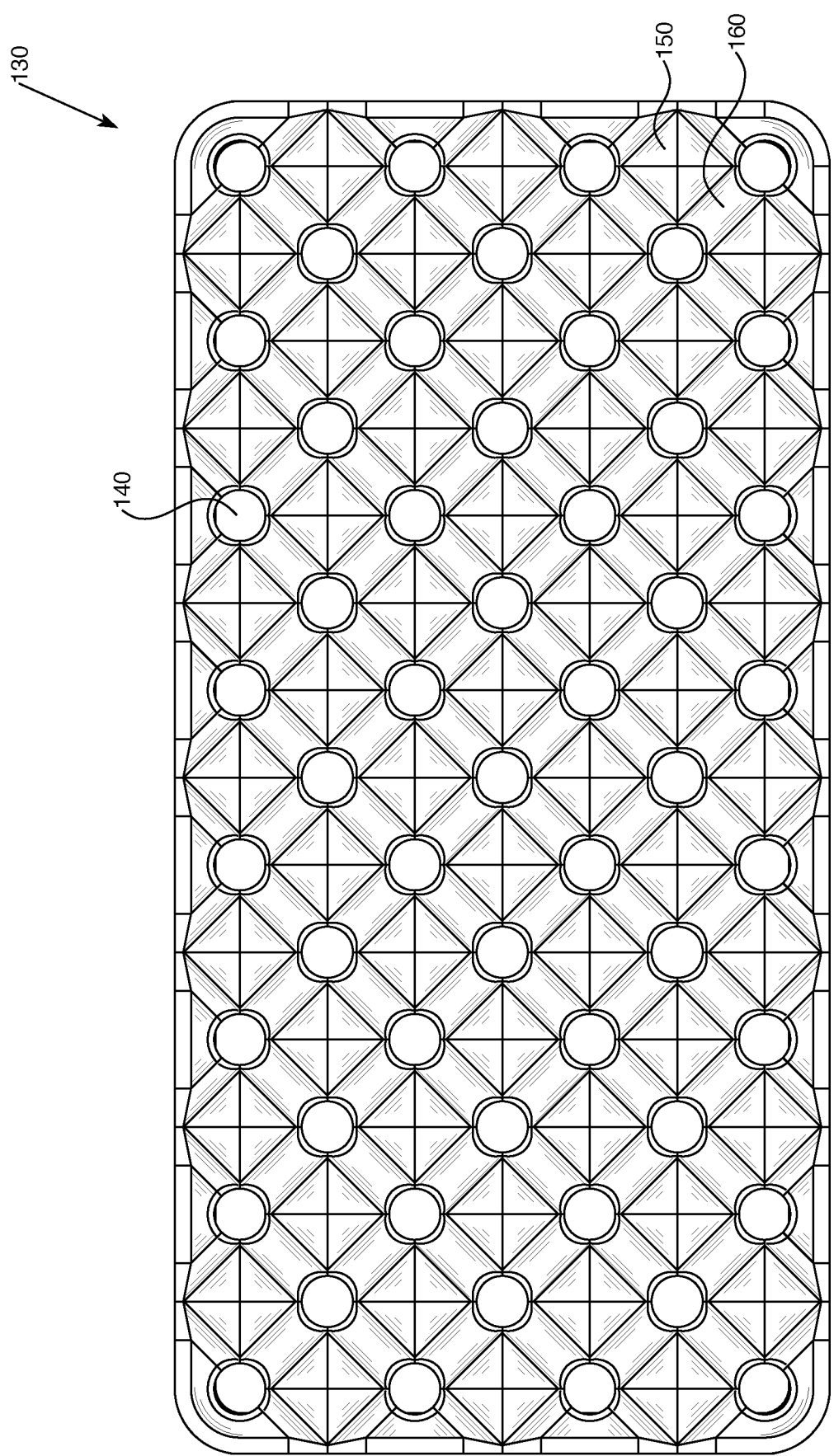
FIG. 3 depicts a front view of an implementation of an external face of a vacuum hose attachment.

FIG. 3 illustrates an exemplary embodiment of an external face 130 of a vacuum hose attachment 100. In a non-limiting exemplary embodiment, external face 130 may comprise external face openings 140, nubs 150, and valleys 160. External face 130 may be rectangular in shape but may any appropriate shape that provides an adequate surface area relative to the cross-sectional area of a vacuum hose. External face openings 140, nubs 150, and valleys 160 may be arranged such that external face openings 140 are in a lattice pattern surrounded by nubs 150 in a first direction and valley 160 in a second direction but can be arranged in any manner such that debris is prevented from suctioning onto the external face 130. In a non-limiting exemplary embodiment, the combined area of the external face openings 140 may be equivalent to the cross-sectional area of a vacuum hose. The nubs 150 may be square pyramid shape, a hemisphere shape, or any other appropriate shape such that debris is prevented from suctioning on the external face 130. In a non-limited exemplary embodiment, the valleys 160 may be substantially the same width as the external face openings 140 and the same length as the nubs 150 such that the entire external face 130 is textured.

Figure 4:
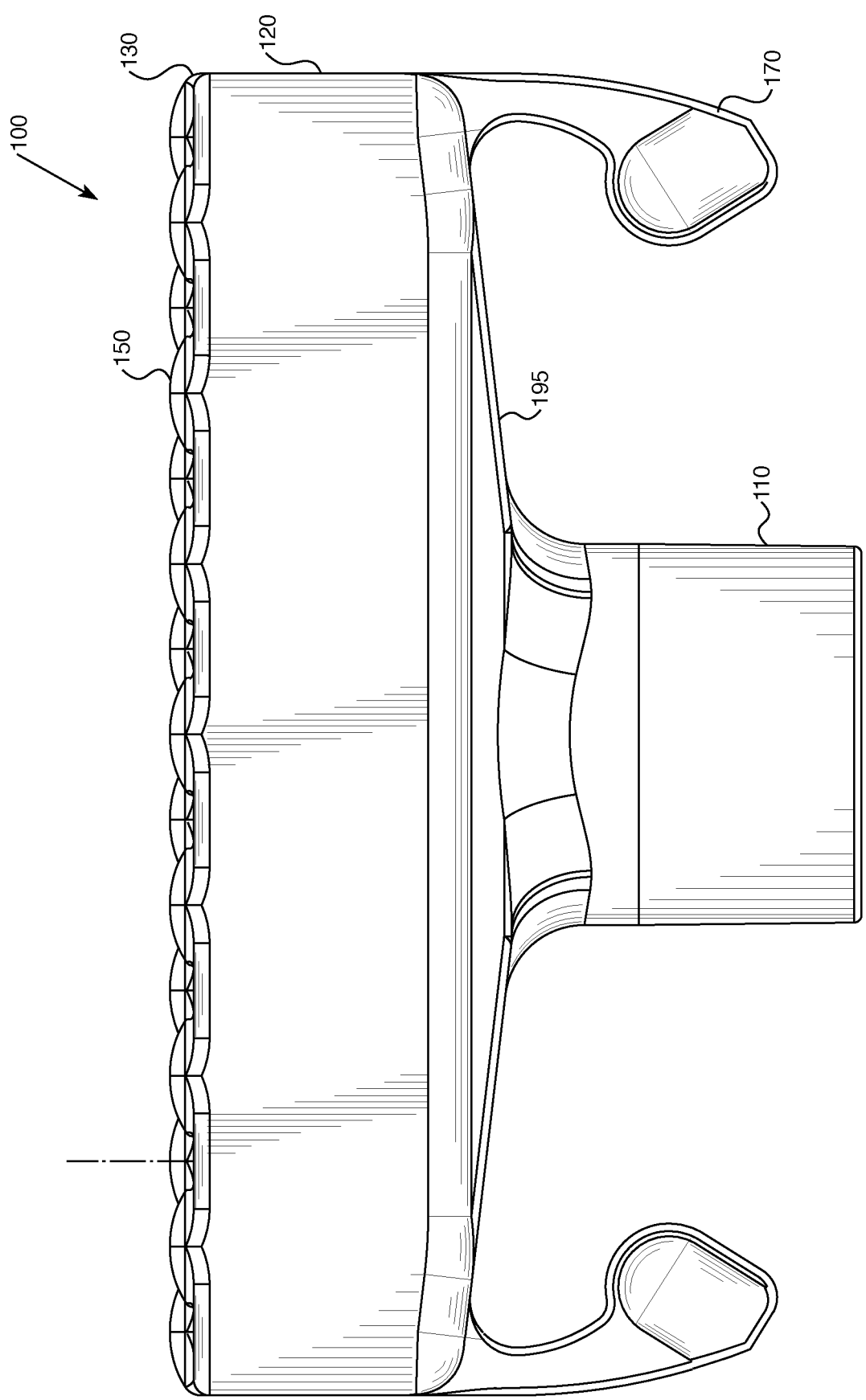
FIG. 4 depicts a first side view of an implementation of a vacuum hose attachment.

FIGS. 4-8 illustrate various angles of an exterior of the embodiment illustrated in FIGS. 1-2. FIG. 4 illustrates a first profile view of the embodiment illustrated in FIGS. 1-2. The collar 110 may be coupled to the attachment body 120 in any appropriate manner such as to sidewalls 190 or collar face 195. In a non-limiting exemplary embodiment, handgrips 170 may be coupled to collar face 195. In a non-limiting exemplary embodiment, the coupling between the collar 110 and the attachment body 120 may be tapered. This taper may provide additional structure and permit the vacuum hose attachment 100 to more firmly couple with a vacuum hose. In a non-limiting exemplary embodiment, the handgrips 170 may be coupled to collar face 195.

Figure 5:
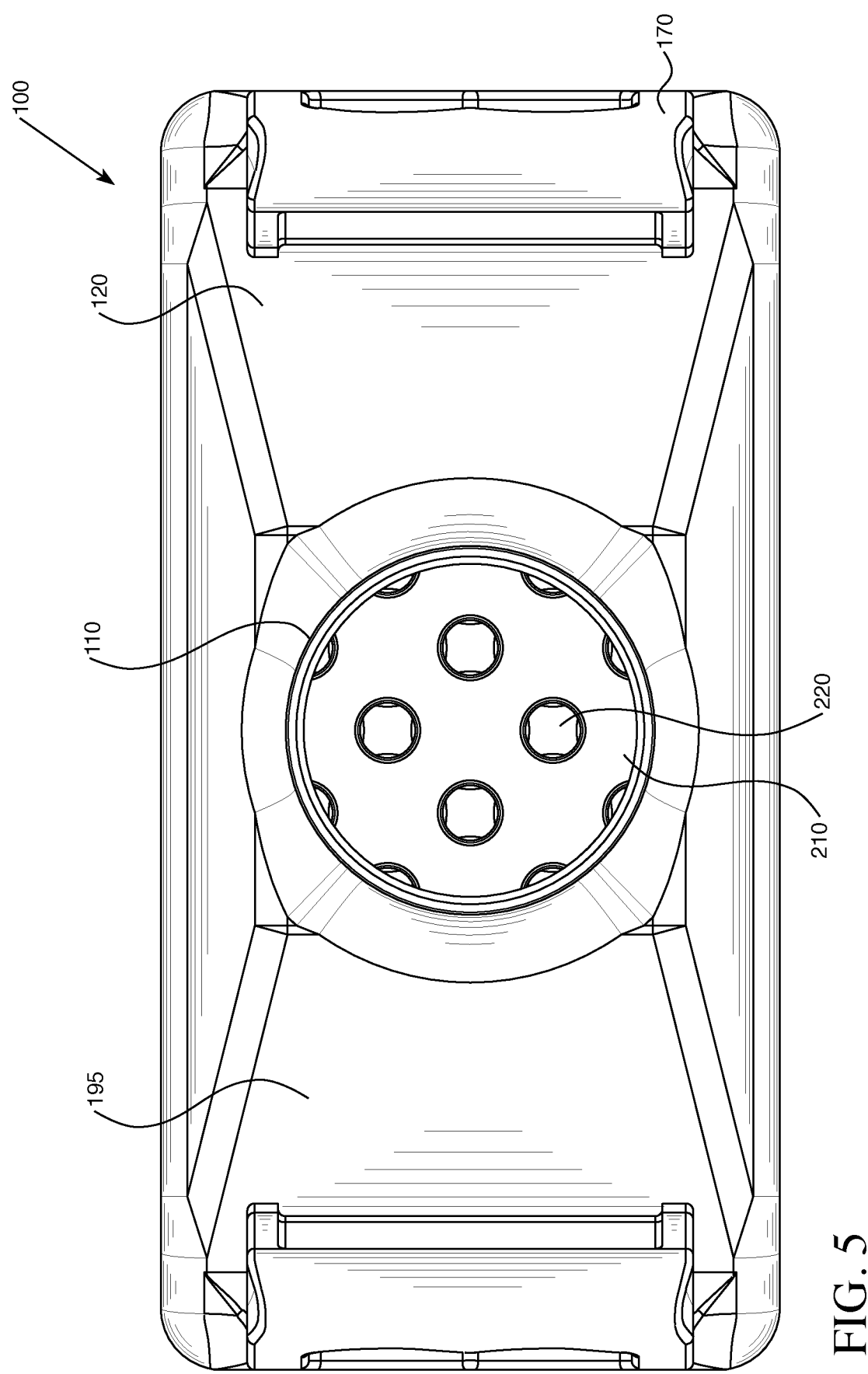
FIG. 5 depicts a rear view of an implementation of a vacuum hose attachment.

FIG. 5 illustrates a bottom view of the embodiment illustrated in FIGS. 1-2. In a non-limiting exemplary embodiment, internal baffle 210 may comprise a flat surface comprising a plurality of internal baffle openings 220. Internal baffle openings 220 may be any shape such as a round or square opening and may be any size smaller than debris that may clog a vacuum hose. Internal baffle openings 220 may have a diameter larger than external face openings 140 such that debris that passes through external face openings 140 may pass through internal baffle openings 220. In a non-limiting exemplary embodiment, internal baffle openings 220 may be round openings with a diameter slightly larger than external face openings 140. Internal baffle openings 220 may be arranged in a lattice pattern.

Figure 6:
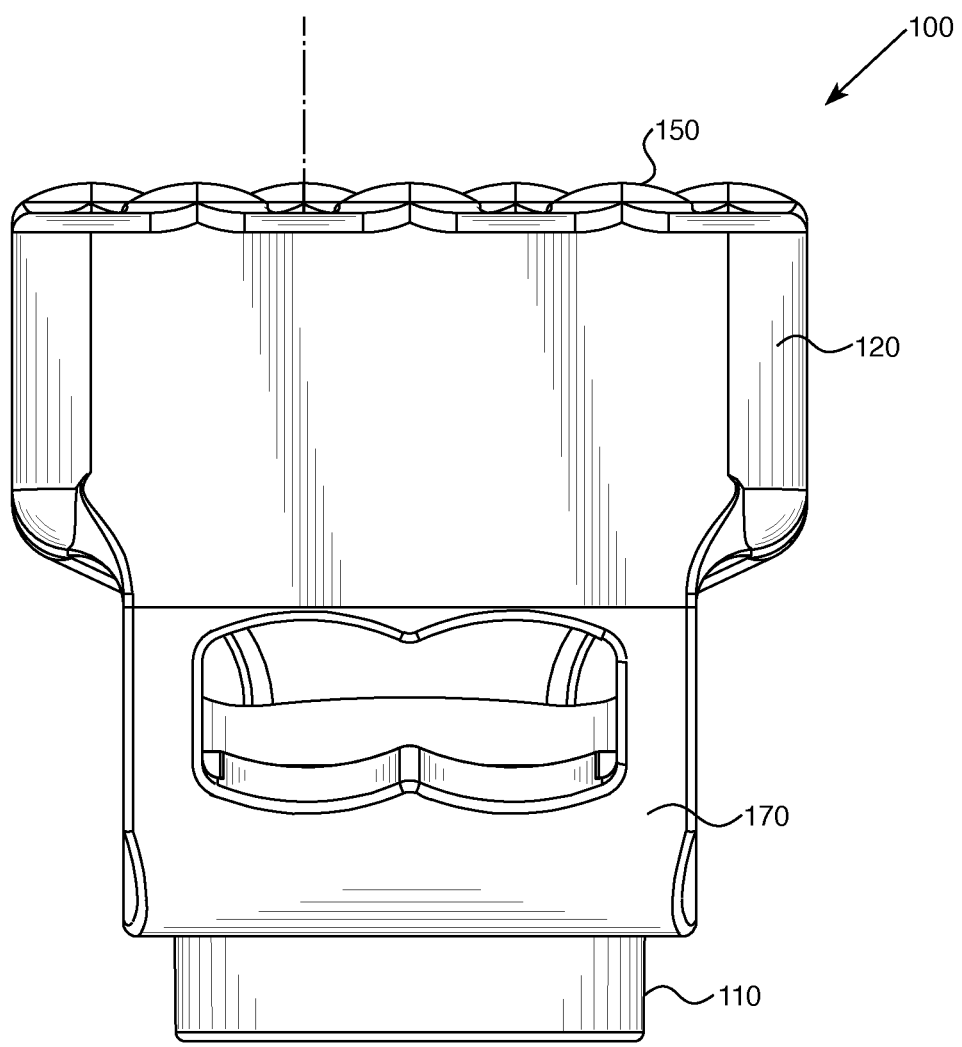
FIG. 6 depicts a second side view of an implementation of a vacuum hose attachment.

FIG. 6 illustrates a second side view of the embodiment illustrated in FIGS. 1-2. Handgrips 170 may extend from collar face 195. In a non-limiting exemplary embodiment, handgrips 170 comprise an opening such that the user may grip handgrips 170 with two fingers while wearing gloves.

Figure 7:
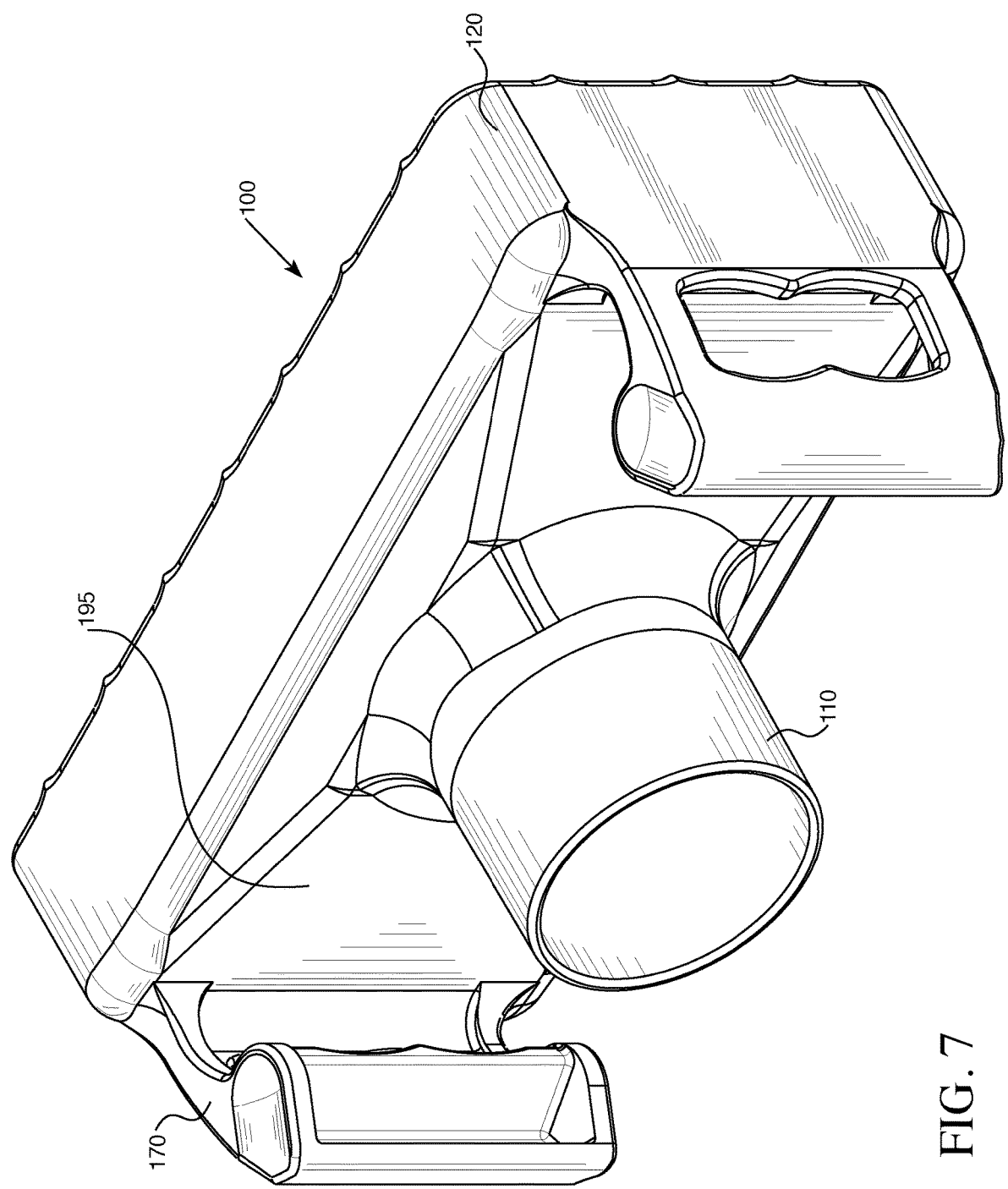
FIG. 7 depicts an isometric bottom view of an implementation of a vacuum hose attachment.
Figure 8:
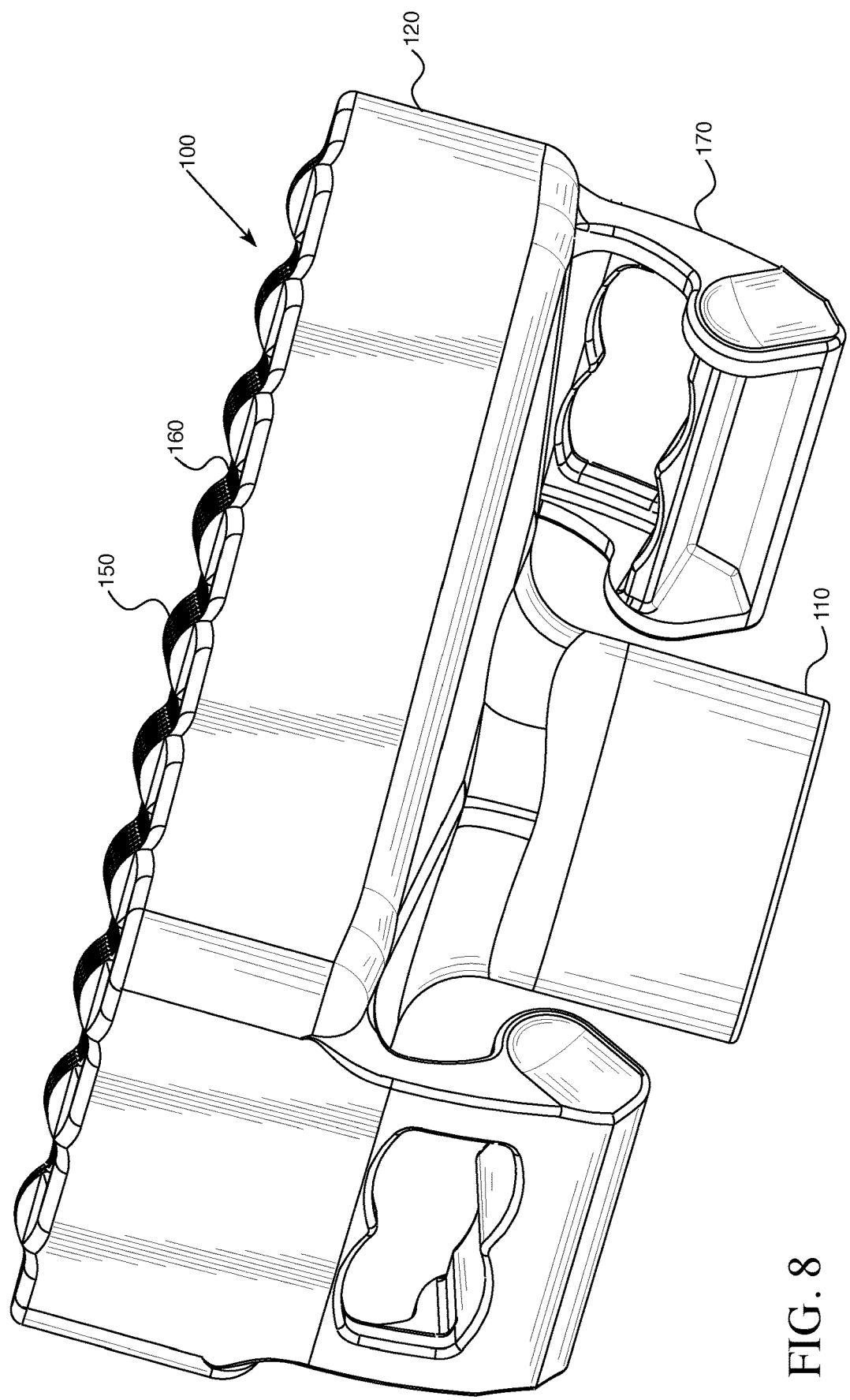
FIG. 8 depicts an alternative isometric view of an implementation of a vacuum hose attachment.

FIGS. 7-8 illustrate an alternative bottom views of the embodiment illustrated in FIGS. 1-2. In a non-limiting exemplary embodiment, the coupling between the collar 110 and the attachment body 120 may be tapered. This taper may provide additional structure and permit vacuum hose attachment 100 to more firmly couple with a vacuum hose. Handgrips 170 may extend from collar face 195. In a non-limiting exemplary embodiment, handgrips 170 comprise an opening such that the user may grip handgrips 170 with two fingers while wearing gloves. Additionally, handgrips 170 comprise a handle that may rest of the user's thumb basal joint providing additional stability to vacuum attachment 100.

Figure 9:
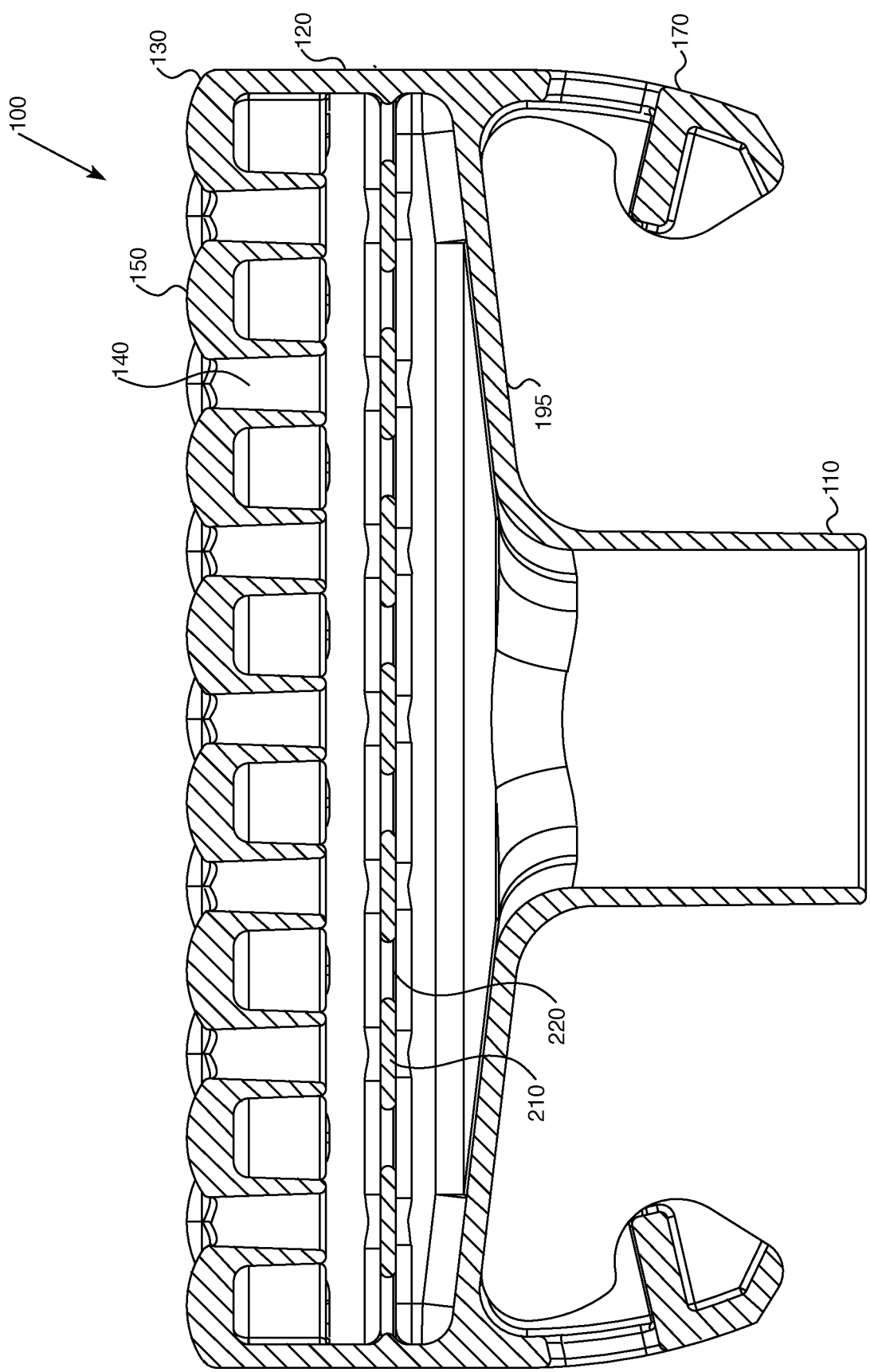
FIG. 9 depicts a cutaway side view of an implementation of a vacuum hose attachment.
Figure 10:
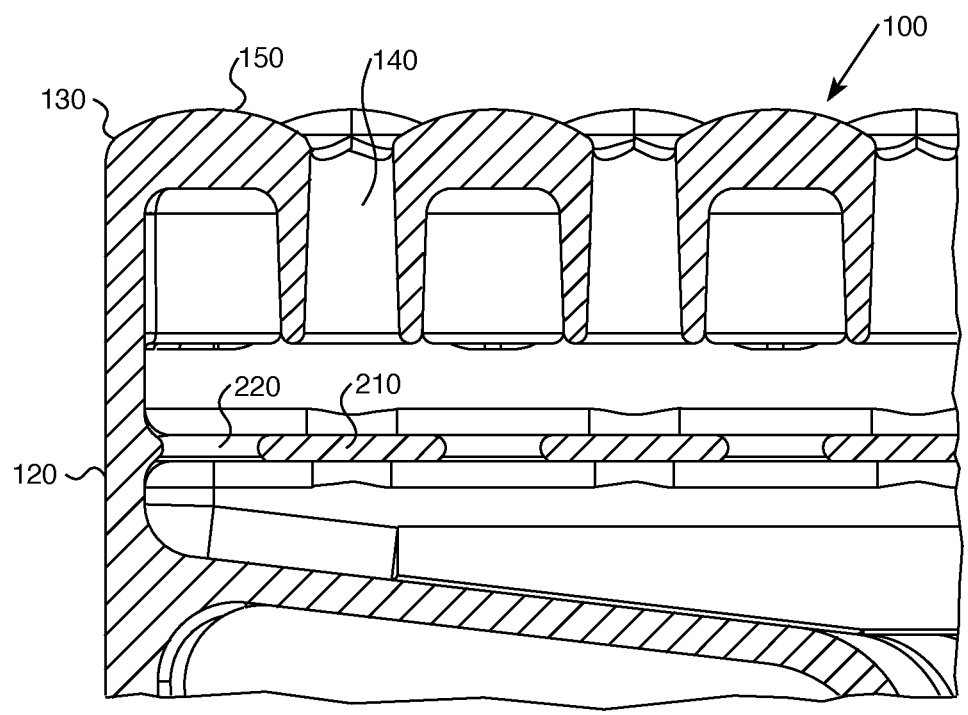
FIG. 10 depicts a close-up cutaway side view of an implementation of a vacuum hose attachment.
Figure 11:
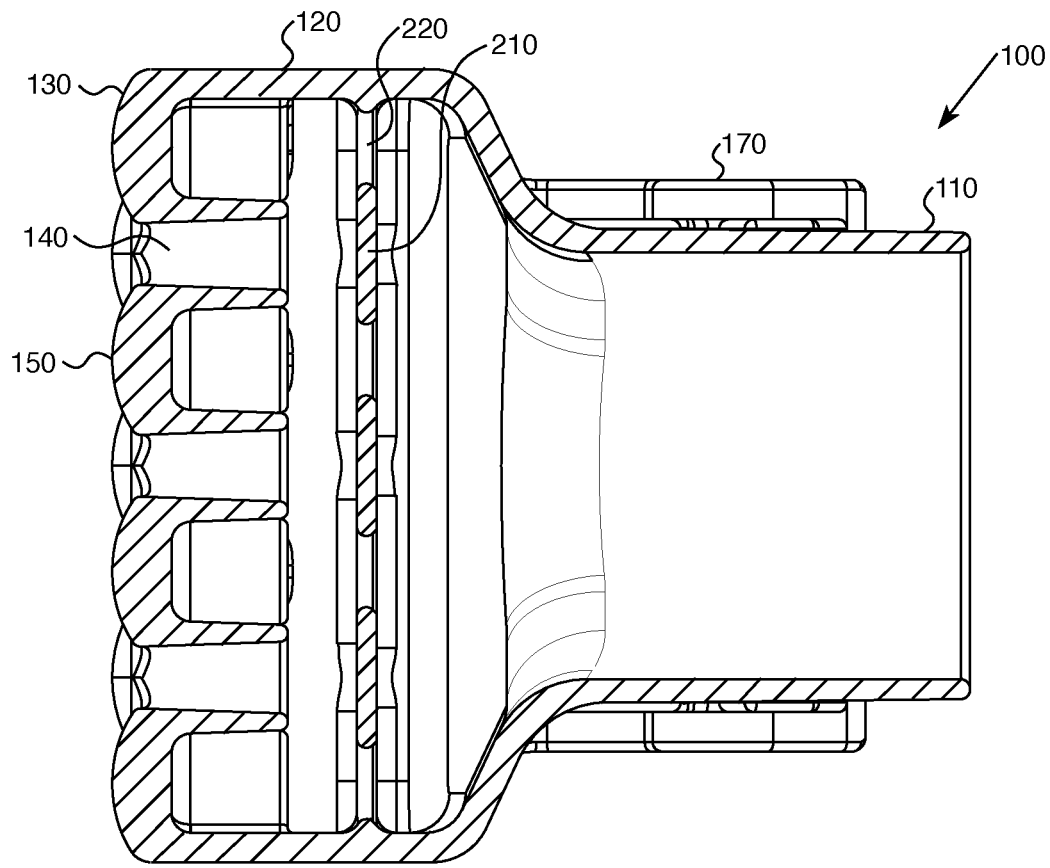
FIGS. 11, 12, and 13 depicts alternative cutaway side views of an implementation of a vacuum hose attachment.
Figure 12:
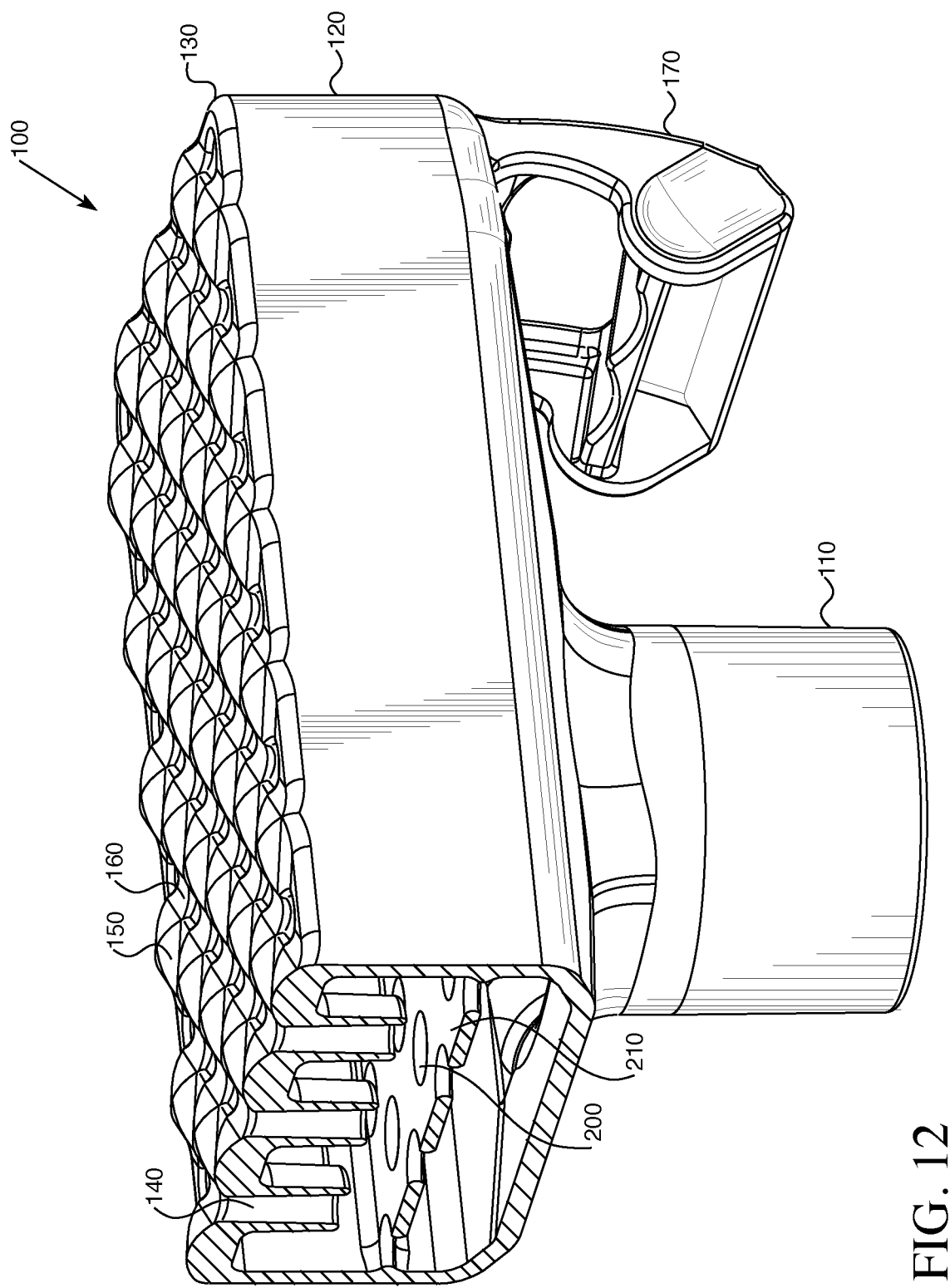
Figure 13:
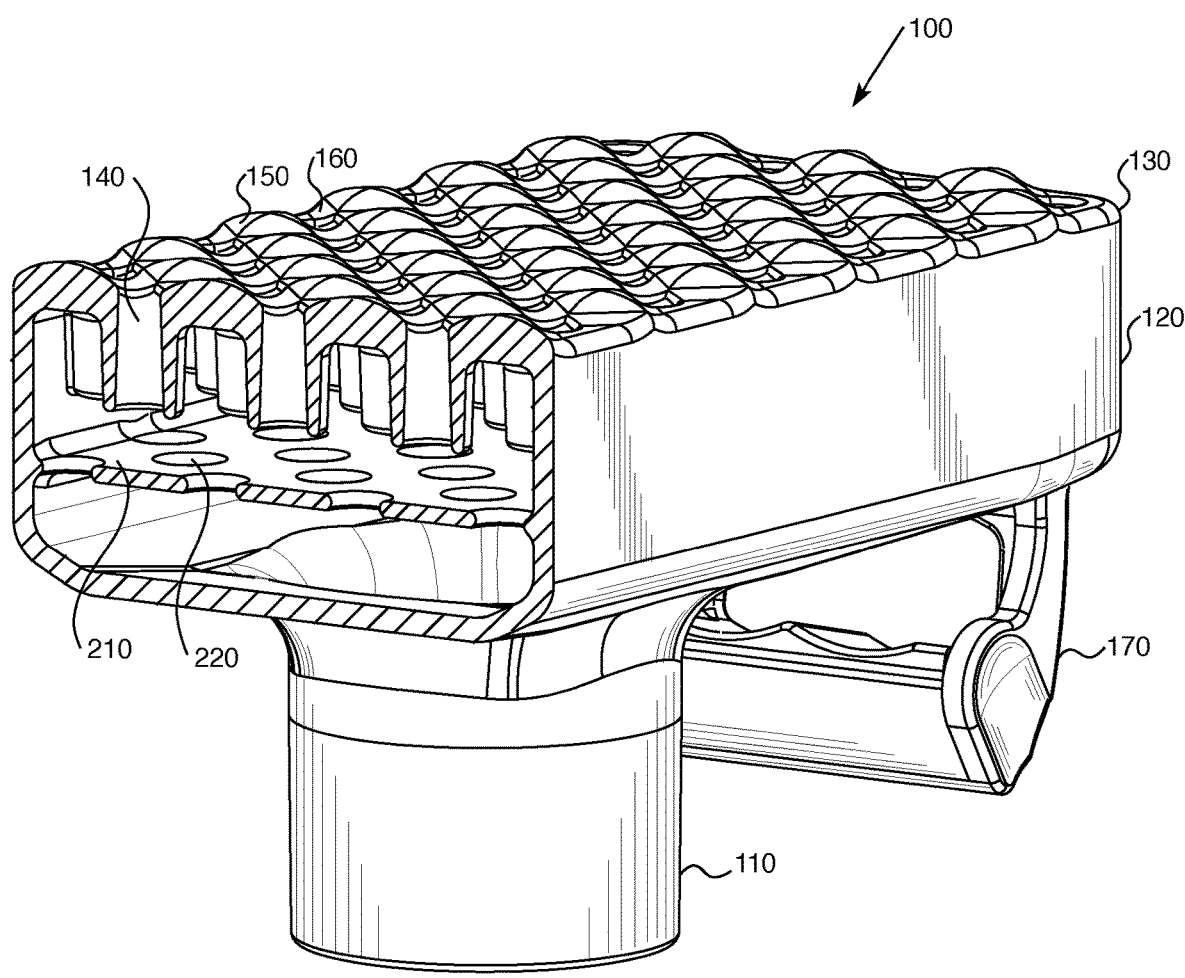

FIGS. 9-13, 17, and 18 illustrate various angles of cutaway views of the embodiment illustrated in FIGS. 1-2. FIG. 9 illustrates a cutaway view of a first profile view as illustrated in FIG. 4 of the embodiment illustrated in FIGS. 1-2. The external face openings 140 may be frustoconically shaped with the smaller diameter end on the external face 130. Internal baffle openings 220 may be a larger diameter than the smaller end of the external face openings 140. Collar face 195 may be tapered such that debris that passes through vacuum attachment 100 is funneled towards collar 100. FIG. 10 illustrates a close-up view of FIG. 9.

FIG. 14 illustrates an exemplary embodiment of a handgrip 170. In this non-limiting exemplary embodiment, handgrips 170 are constructed such that a user may fit two fingers into the handgrip 170 to provide stability to the vacuum hose attachment 100. However, handgrips 170 may take an appropriate shape to provide stability to vacuum hose attachment 100. Additionally, handgrips 170 may be omitted entirely.

Figure 15:
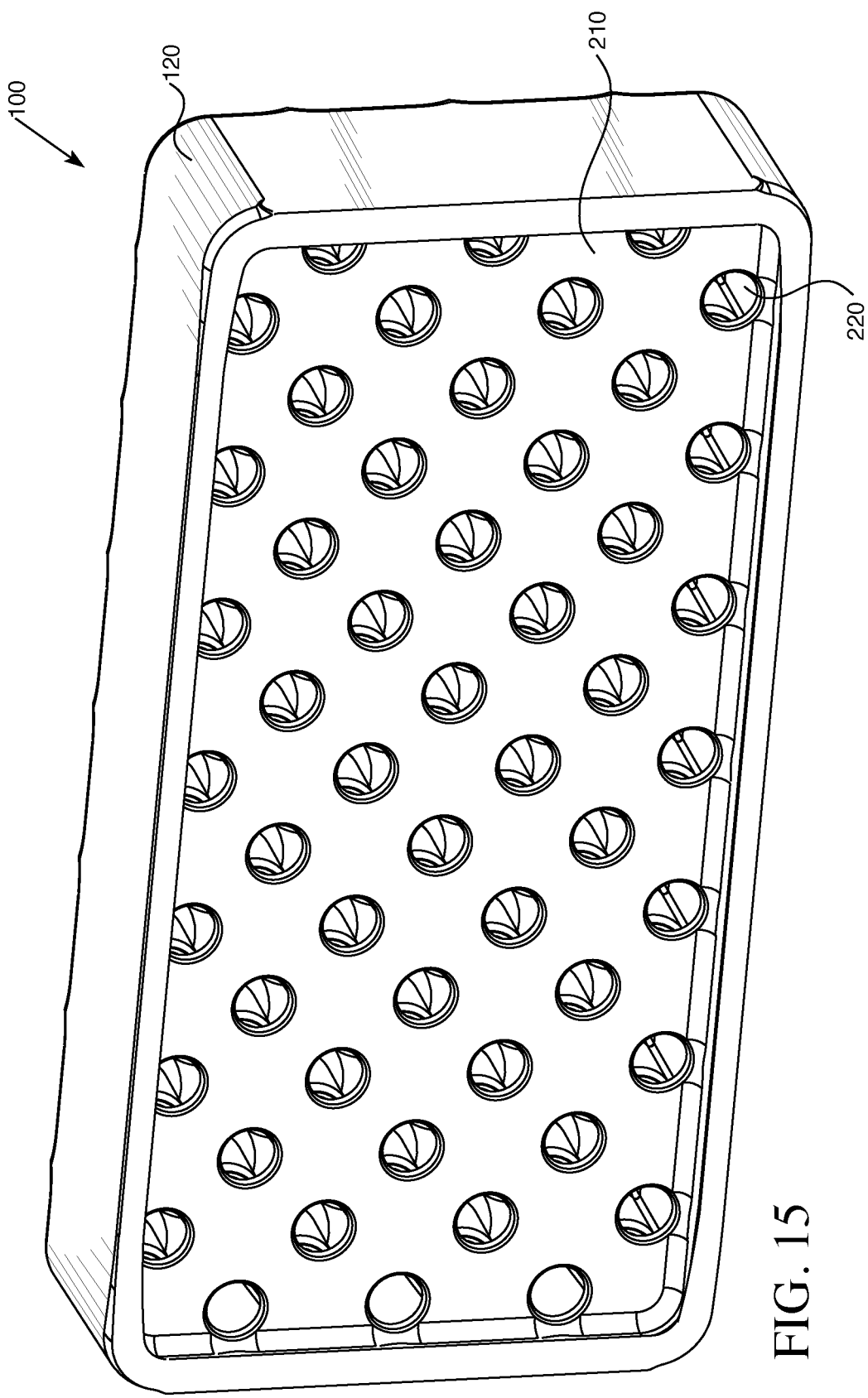
FIG. 15 depicts an internal bottom view within an implementation of a vacuum hose attachment.

FIG. 15 illustrates a complete view of internal baffle 210 of the embodiment illustrated in FIGS. 1-2. Internal baffle 210 may be disposed within attachment body 120 and may be configured to prevent long, sharp debris from passing through vacuum attachment 100. In a non-limiting exemplary embodiment, internal baffle 210 may comprise a flat surface comprising a plurality of internal baffle openings 220. Internal baffle openings 220 may be any shape such as a round or square opening and may be any size smaller than debris that may clog a vacuum hose. Internal baffle openings 220 may have a diameter larger than external face openings 140 such that debris that passes through external face openings 140 may pass through internal baffle openings 220.

Figure 16:
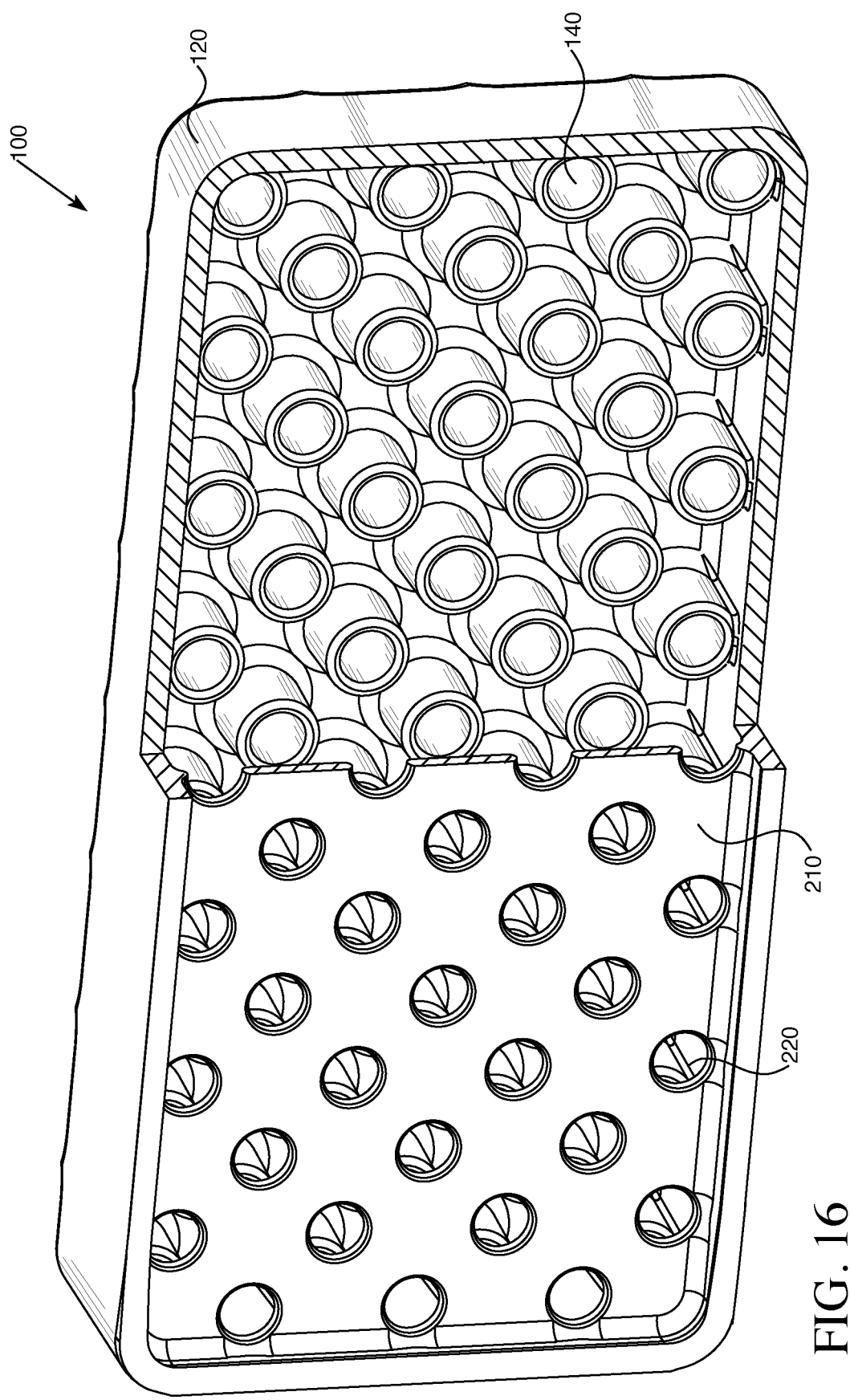
FIG. 16 depicts an internal cutaway bottom view within an implementation of a vacuum hose attachment.
Figure 17:
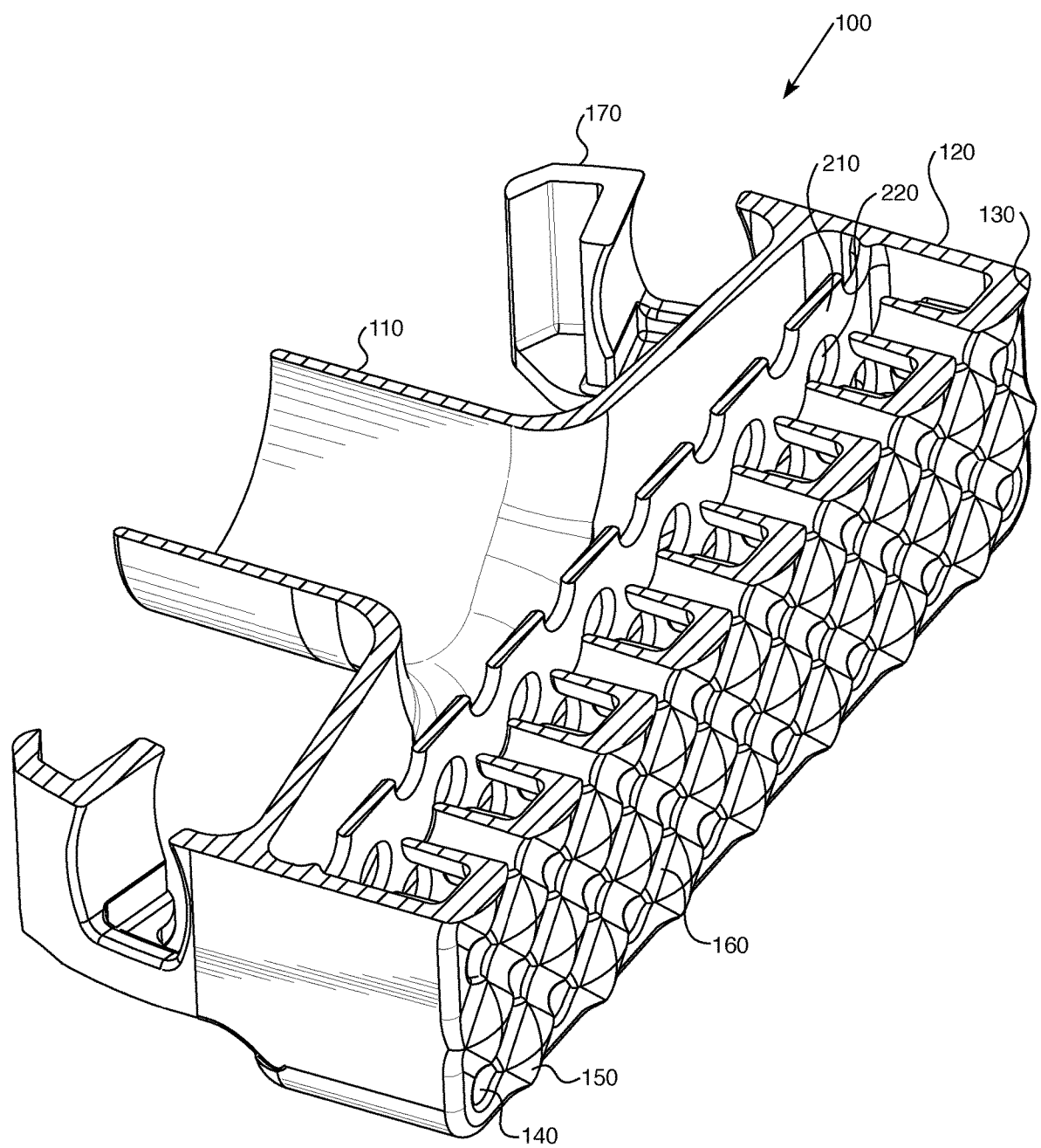
FIGS. 17 and 18 depict an alternative cutaway isometric view of an implementation of a vacuum hose attachment.
Figure 18:
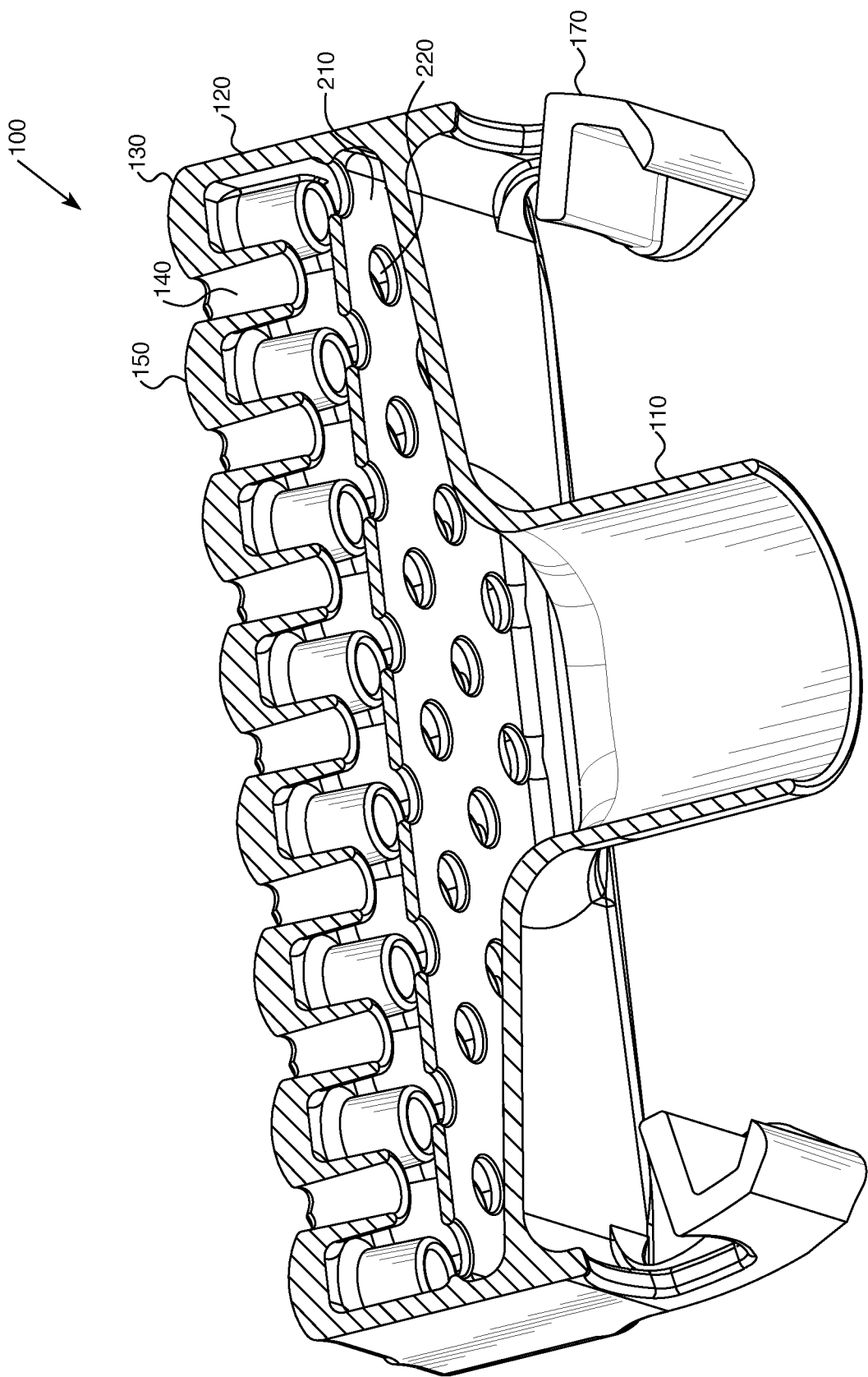

In a non-limiting exemplary embodiment, internal baffle openings 220 may be round openings with a diameter slightly larger than external face openings 140. Internal baffle openings 220 may be arranged in a lattice pattern. FIG. 16 illustrates a cutaway of the view in FIG. 15 of the embodiment illustrated in FIGS. 1-2. Axes perpendicular to external face 130 pass through external face openings 140. Internal baffle openings 220 are non-coaxial with the axes passing through external face openings 140 such that long, sharp debris may be prevented from passing through vacuum attachment 100.]

Structure

The collar 110 provides a coupling point to attach the vacuum hose attachment 100 to the vacuum hose. The collar 110 is coupled directly or indirectly to the vacuum hose on its first end and the attachment body 120 on its second end. Collar 110 may be detachable from attachment body 120. In the present embodiment, the collar 110 is coupled to the attachment body 120 and configured to couple to the vacuum hose. The collar 110 may comprise any system for coupling the vacuum hose attachment 100 to the vacuum hose. In the present embodiment, the collar 110 comprises a round element that fits within the vacuum hose and couples to the attachment body 120. The coupling between collar 110 and attachment body 120 may be tapered such that collar 110 fits firmly into a vacuum hose.

The attachment body 120 comprises the external face 130, sidewalls 190, collar face 195, and the internal baffle 210. Attachment body 120 may further comprise handgrips 170 which may be coupled to collar face 195. In the present embodiment, the attachment body 120 is coupled to the collar 110 and is the structure around the external face 130 and the internal baffle 210. The attachment body 120 may comprise any system for providing structure to the device. In the present embodiment, the attachment body 120 comprises a rigid, hollow rectangular prism-like structure comprising external face 130, sidewalls 190, and collar face 195 with internal baffle 210 disposed within and coupled to the collar 110.

The external face 130 limits debris entering the vacuum hose. The external face 130 is on the exterior of the attachment body 120. In the present embodiment, the external face 130 is situated on the opposite side of the attachment body 120 as the collar face 195 and collar 110. In the present embodiment, external face 130 comprises external face openings 140, nubs 150, and valleys 160. The external face openings 140, nubs 150, and valleys 160 on the external face 130 may be configured in any suitable manner to prevent debris from suctioning onto the external face 130 of the vacuum hose attachment 100.

The external face openings 140 allow debris to pass through external face 130 of the vacuum hose attachment 100. The external face openings 140 are located on the external face 130 of the vacuum hose attachment 100 and are separated by nubs 150, and valleys 160. In the present embodiment, the external face openings 140 comprise round openings arranged in a lattice pattern on the external face 130 of the vacuum hose attachment 100 separated by a nub 150 in a first direction and a valley 160 in a second direction. The external face openings 140 may be frustoconically shaped.

The nubs 150 and valleys 160 prevent debris from suctioning onto the external face 130. In the present embodiment, the nubs 150 and valleys 160 separate the openings on the external face 130 of the vacuum hose attachment 100. The nubs 150 and valleys 160 may comprise any system for preventing debris from suctioning onto the external face 130. In the present embodiment, the nub 150 comprises a rounded square pyramid shape approximately twice the width of the external face openings 140. However, the nubs 150 may be in any appropriate shape that would prevent debris from suctioning onto the external face 130 of the vacuum hose attachment 100. The valley 160 is approximately equal in length of the nub 150 and approximately equal in width to the external face openings 140.

The internal baffle 210 prevents long debris, such as long splinters, from entering the vacuum hose. In the present embodiment, the internal baffle 210 is within the attachment body 120 between the external face 130 and the collar 110 and comprises internal baffle openings 220.

The internal baffle openings 220 allow debris to pass through internal baffle 210 of the vacuum hose attachment 100. The internal baffle openings 220 are located on the internal baffle 210 of the vacuum hose attachment 100. In the present embodiment, the internal baffle openings 220 comprise round openings arranged in a lattice pattern on the internal baffle 210 of the vacuum hose attachment 100. The lattice pattern on the internal baffle 210 is not aligned with the lattice pattern on the external face 130 such that long debris may not immediately pass through both the external face 130 and the internal baffle 210.

Operation

The present system separates debris with a vacuum hose attachment 100. The process prevents large debris from clogging the vacuum and long debris from damaging the vacuum hose. In the present embodiment, the system allows airflow across the external face 130 of the vacuum hose attachment 100 such that debris is prevented from suctioning onto the external face 130 of the vacuum hose attachment 100. Debris smaller than the external face openings 140 is allowed to pass through the external face openings 140. Debris that passes through the external face 130 is allowed to pass through the internal baffle openings 220. The system may, however, perform any appropriate process to separate debris and prevent debris from clogging the vacuum.

It can be appreciated that there are various other designs and methods that can be implemented to achieve the goals of this system and method, and the terms employed in this description are given as examples and are not limiting so as to exclude alternate embodiments that could be employed to achieve the goals and inventive aspects of the disclosed invention. The embodiments recited above are given only as examples and are to be construed as such.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed:

1. A vacuum hose attachment, comprising:
a collar comprising a first end and a second end, the collar coupled to an attachment body at the second end and configured to couple to a vacuum hose at the first end;
wherein the attachment body comprises an external face on an exterior of the attachment body and an internal baffle within the attachment body between the external face and the second end of the collar wherein the external face comprises two or more external face openings separated by at least one of a nub and a valley substantially adjacent to at least one of the two or more external face openings such that the external face openings are lower than a highest point of any nub, and the internal baffle comprises two or more internal baffle openings each internal baffle opening being positioned non-coaxially relative to any of a plurality of axes perpendicular to the external face, wherein each axis among the plurality of axes passes through a center of a different external face opening.

2. The vacuum hose attachment of claim 1 wherein the external face openings are arranged in a lattice pattern.

3. The external face openings arrangement of claim 2 wherein the external face openings are separated by a nub in a first direction and a valley in a second direction.

4. The vacuum hose attachment of claim 1 wherein the collar is detachable.

5. The vacuum hose attachment of claim 1 wherein the nub is a square pyramid extending from the external face away from the collar.

6. The vacuum hose attachment of claim 1 wherein the nub is a hemisphere extending from the external face away from the collar.

7. The vacuum hose attachment of claim 1 wherein the nub is about twice a width of the external face opening.

8. The vacuum hose attachment of claim 1 wherein a combined area of the plurality of external face openings is equivalent to a cross-sectional area of the vacuum hose.

9. The vacuum hose attachment of claim 1 wherein the external face opening is frustoconically shaped.

10. The vacuum hose attachment of claim 1 wherein each valley is a same width as each opening and a same length as each nub.

11. The vacuum hose attachment of claim 1 wherein the collar is configured to be housed inside the vacuum hose.

12. The vacuum hose attachment of claim 1 further comprising a handgrip on the attachment body.

13. The vacuum hose attachment of claim 1 where the vacuum hose attachment is comprised of nylon.

14. A method of separating debris comprising:
coupling a vacuum hose attachment to a vacuum hose;
preventing debris from suctioning into an external face of the vacuum hose attachment by allowing airflow across an external face of the vacuum hose attachment comprising two or more external face openings separated by at least one of a nub and a valley substantially adjacent to at least one of the two or more external face openings wherein the external face openings are lower than a highest point of any nub;
allowing debris smaller than the external face opening in the external face of the vacuum hose attachment to pass through the external face opening; and
allowing debris to pass through two or more internal baffle openings positioned non-coaxially relative to any of a plurality of axes perpendicular to the external face, wherein each axis among the plurality of axes passes through a center of a different external face opening such that long debris is prevented from passing through the vacuum hose attachment.

* * * * *